United States Patent [19]

Casperson

[11] 4,401,402
[45] Aug. 30, 1983

[54] LIQUID SEAL LOCK HOPPERS AND METHOD OF UTILIZING SAME

[75] Inventor: John R. Casperson, Bartlesville, Okla.

[73] Assignee: Phillips Petroleum Company, Bartlesville, Okla.

[21] Appl. No.: 273,558

[22] Filed: Jun. 16, 1981

[51] Int. Cl.³ .......................... B65G 53/30; B01J 8/08
[52] U.S. Cl. ................................... 414/218; 414/221; 422/232; 408/109
[58] Field of Search .............. 414/217, 218, 219, 220, 414/221, 290, 292; 48/202, 72, 86 R; 422/219, 232; 406/109, 124, 82

[56] References Cited

U.S. PATENT DOCUMENTS

| | | | |
|---|---|---|---|
| 2,443,180 | 6/1948 | Bergstrom | 414/217 |
| 2,704,704 | 3/1955 | Ogorzaly | 48/206 |
| 2,767,130 | 10/1956 | Bearer | 196/55 |
| 2,828,026 | 3/1958 | Strong | 214/17 |
| 2,985,324 | 5/1961 | Balentine | 414/217 |
| 3,009,588 | 11/1961 | Mitchell | 214/17 |
| 3,410,791 | 11/1968 | Perry et al. | 422/219 |
| 3,729,105 | 4/1973 | Huebler et al. | 214/17 B |
| 3,950,146 | 4/1976 | Funk | 48/69 |
| 3,950,147 | 4/1976 | Funk et al. | 48/86 R |
| 4,003,797 | 1/1977 | Cheadle et al. | 201/28 |
| 4,017,270 | 4/1977 | Funk et al. | 48/197 R |
| 4,125,384 | 11/1978 | Funk | 48/86 R |
| 4,126,519 | 11/1978 | Murray | 201/32 |
| 4,247,240 | 1/1981 | Schora, Jr. et al. | 414/218 |

OTHER PUBLICATIONS

Lewis, R., Chem. Eng. Prog., vol. 71, No. 4, p. 68, Apr. 1975.
"Synthetic Oil from Eastern Shale," A Brochure Distributed by Gas Developments Corporation and Bechtel, National, 1980, pp. 10 & 11.

Primary Examiner—Bruce H. Stoner, Jr.
Assistant Examiner—Donald Hajec

[57] ABSTRACT

Liquid sealed lock hoppers for use with a particulate material having a density greater than that of the sealing liquid are provided for connection to the inlet and outlet of a high pressure zone.

30 Claims, 6 Drawing Figures

LIQUID SEAL LOCK HOPPERS AND METHOD OF UTILIZING SAME

BACKGROUND OF THE INVENTION

The invention relates to liquid sealed lock hoppers. In one aspect it relates to a liquid sealed lock hopper for introducing particulate material into a high pressure zone. In another aspect, it relates to a liquid sealed lock hopper system for withdrawing particulate material from a high pressure zone. In yet another aspect, it relates to a liquid sealed lock hopper system for introducing and withdrawing particulate material from a high pressure zone.

Valuable products can be extracted from particulate materials such as minerals, by subjecting the materials to conversion conditions including elevated pressure. For example, valuable hydrocarbon products can be produced from kerogen and/or bitumen containing materials, such as coal, oil and tar sands, oil shale, and petroleum residues by subjecting same to processes such as pyrolysis, flash pyrolysis, retorting, extraction, or supercritical extraction. It is sometimes beneficial or necessary to conduct such processes under conditions of high pressure.

A problem which has faced the industry in conducting such processes is that of charging and withdrawing the particulate material to and from the high pressure zone. Gas sealed lock hoppers have been used to partially overcome the problem, but such devices suffer from drawbacks. One problem encountered in the operation of gas sealed lock hoppers is that they must be repressurized between cycles, and repressurizing vessels with gas in expensive, time consuming, and inefficient. Another problem is that the exhaust lock hoppers bleed gas from the system. Yet another drawback to the utilization of gas sealed lock hoppers systems lies in their valving. The valves must operate in a dusty and abrasive environment, with a consequent short working life. It has thus proved difficult to provide valves for such systems which long provide a reliable gas seal across a pressure difference of over about 300 psig (pounds per square inch, gauge). As many processes are conducted at pressures higher than 300 psig the gas sealed lock hoppers must be provided in series to handle the higher pressure difference. Liquid sealed lock hoppers can avoid these problems. It would be desirable to provide a liquid sealed lock hopper to replace a gas sealed system.

One promising liquid seal lock hopper is disclosed by Huebler et al, U.S. Pat. No. 3,729,105, Apr. 24, 1973. In that system, a volume of liquid equal to the volume of solids withdrawn from the lock hopper is introduced as the solids are withdrawn. The liquid must be pumped into the lock hopper cyclically and against a pressure gradient. It would be desirable to provide a liquid sealed lock hopper in which pumping liquid against a pressure gradient need not be in a cyclic fashion, whereby a lower capacity pump could be employed. It would be even more desirable to provide a liquid sealed lock hopper system which substantially mitigates or eliminates the need for pumps capable of pumping a liquid against a high pressure gradient, hereinafter referred to as high pressure pumps.

Another promising liquid sealed lock hopper system is disclosed by Schora, Jr. et al, U.S. Pat. No. 4,247,240 Jan. 27, 1981. Schora is an improvement over Huebler et al in that the introduction of liquid into the high pressure zone is avoided by passing the mixture of particulate and liquid over a screen, and by recovering the liquid from beneath the screen and recycling it to the lock hopper. The mixture of liquid and particulate is lifted by an auger or a bucket ladder on to the screen. It would be desirable to provide a liquid sealed lock hopper in which the need for lifting the liquid to great heights is reduced or eliminated. It would be further desirable to provide a liquid sealed lock hopper for withdrawing particulate material from a high pressure zone without losing pressure from the zone.

OBJECTS OF THE INVENTION

It is an object of this invention to provide an energy-efficient method and apparatus for introducing particulate material into a high pressure zone.

It is another object of this invention to provide a method and apparatus for withdrawing particulate material from a high pressure zone without depressuring the zone.

It is a still further object of this invention to provide an energy efficient method and apparatus for introducing and withdrawing a particulate material to and from a high pressure zone.

SUMMARY OF THE INVENTION

In one aspect of the invention, a lock hopper system especially useful for introducing a particulate material from a low pressure zone into a high pressure zone comprises:

(a) A sealable vessel having an inlet and an outlet;

(b) a first valve means cooperating with the inlet of the first sealable vessel;

(c) a second valve means cooperating with the outlet of the first sealable vessel;

(d) a conduit means including an elevator housing having an upper end, a lower end, an inlet, and an outlet, with the outlet of the first sealable vessel being in flow communication with the inlet of the elevator housing, the outlet of the elevator housing being positioned above the inlet of the elevator housing;

(e) a means cooperating with the elevator housing for selectively conveying a particulate material from the inlet of the elevator housing to the outlet; and (f) a means for maintaining a liquid level in said elevator housing between the inlet of the elevator housing and the outlet of the elevator housing.

In use, the first vessel is maintained full of liquid or liquid and particulate material, with a liquid level at the top of or above the vessel. A second liquid level is maintained in the elevator housing. The apparatus can be operated, for example, by a process comprising:

(a) With the outlet closed, opening the inlet to the vessel, while it is liquid-filled, (b) passing a particulate material having a density greater than that of the liquid downward through a first liquid level and into the vessel through the open inlet;

(c) closing the vessel inlet;

(d) opening the vessel outlet;

(e) transporting the particulate material through the outlet of the vessel, through the conduit means, upwards through a second liquid level maintained in the conduit means, and into a high pressure zone.

The high pressure zone acting against the second liquid level serves to keep the vessel full. In this embodiment, the need for lifting a mixture of particulate and liquid to a reactor can be eliminated, as well as high pressure, high capacity liquid pumps coupled to the lock hopper.

In another aspect of the invention, a lock hopper system especially useful for withdrawing a particulate material from a high pressure zone to a low pressure zone comprises:

(a) a first vessel having an inlet and an outlet (b) a first conduit means connected to the inlet of the first vessel (c) a first valve means cooperating with the inlet of the first vessel (d) a second valve means cooperating with the outlet of the first vessel; and (e) a means for maintaining a liquid level in the first conduit means.

A liquid level is maintained in the first conduit means. The vessel, at different times, is empty, full of liquid, or full of a mixture of liquid and particulate. The apparatus can be operated, for example, by a process comprising:

(a) at least substantially filling the vessel with a liquid;

(b) sealing the vessel;

(c) with the outlet closed, opening the inlet to the vessel, the inlet being in flow communication via the conduit means with a high pressure zone;

(d) passing a particulate material having a density greater than that of the liquid from the high pressure zone, through the conduit means and into the vessel through its inlet;

(e) closing the inlet to the vessel;

(f) opening the outlet to the vessel; and (g) passing the mixture of liquid and particulate material through the outlet and from the vessel.

Particulate material falling into the vessel causes the liquid to rise in the conduit, from where it can be easily withdrawn without depressuring the high pressure zone. The vessel can be, after withdrawal of material, easily refilled with liquid because it is at atmospheric pressure. The system eliminates substantial pressure loss from the high pressure zone as particulate is withdrawn, and does so without expensive pumps capable of pumping against a high pressure difference.

In yet another aspect of the invention, a lock hopper system especially useful for introducing and withdrawing particulate material to and from a high pressure zone comprises:

(a) A first vessel having an inlet and an outlet;

(b) a first valve means associated with the inlet of the first vessel;

(c) a second valve means associated with the outlet of the first vessel;

(d) an elevator housing having an upper end, a lower end, an inlet, and an outlet between the inlet and the upper end, with the inlet of the elevator housing in flow communication with the outlet of the first vessel;

(e) a means associated with the interior of the elevator housing for conveying a particulate material from the inlet of the elevator housing to the outlet;

(f) a second vessel having an upper inlet and a lower outlet with its inlet in flow communication with the outlet of the elevator housing;

(g) a third vessel having an inlet and an outlet;

(h) a first conduit means establishing flow communication between the outlet of the second vessel and the inlet of the third vessel;

(i) a third valve means associated with the inlet of the third vessel;

(j) a fourth valve means associated with the outlet of the third vessel; and (k) a second conduit means establishing flow communication between the first conduit means and the elevator housing.

In use, the third vessel is maintained fall of liquid and liquid levels are maintained in the elevator housing and the first conduit means. The apparatus can be operated, for example, by a process comprising (a) Substantially filling the third vessel with a liquid;

(b) Pressurizing the liquid (c) displacing a portion of the liquid from the third vessel with a particulate material having a density greater than that of the liquid;

(d) conveying the displaced portion of the liquid to the first vessel;

(e) depressurizing the liquid in the first vessel; and (f) displacing a portion of the liquid from the first vessel with a particulate material having a density greater than that of the liquid.

When a particulate material, such as oil shale, is subjected to a conversion process, such as retorting, in which little or no reduction in the displacement volume of the particulate material occurs, only an amount of liquid sufficient to offset valve leakage and the amount by which the particulate material has shrunk, if any, need be pumped against a high pressure gradient. The energy needed to operate the lock hoppers is only a small fraction of that necessary to power prior art systems.

DESCRIPTION OF THE PREFERRED EMBODIMENTS

Figure 1:
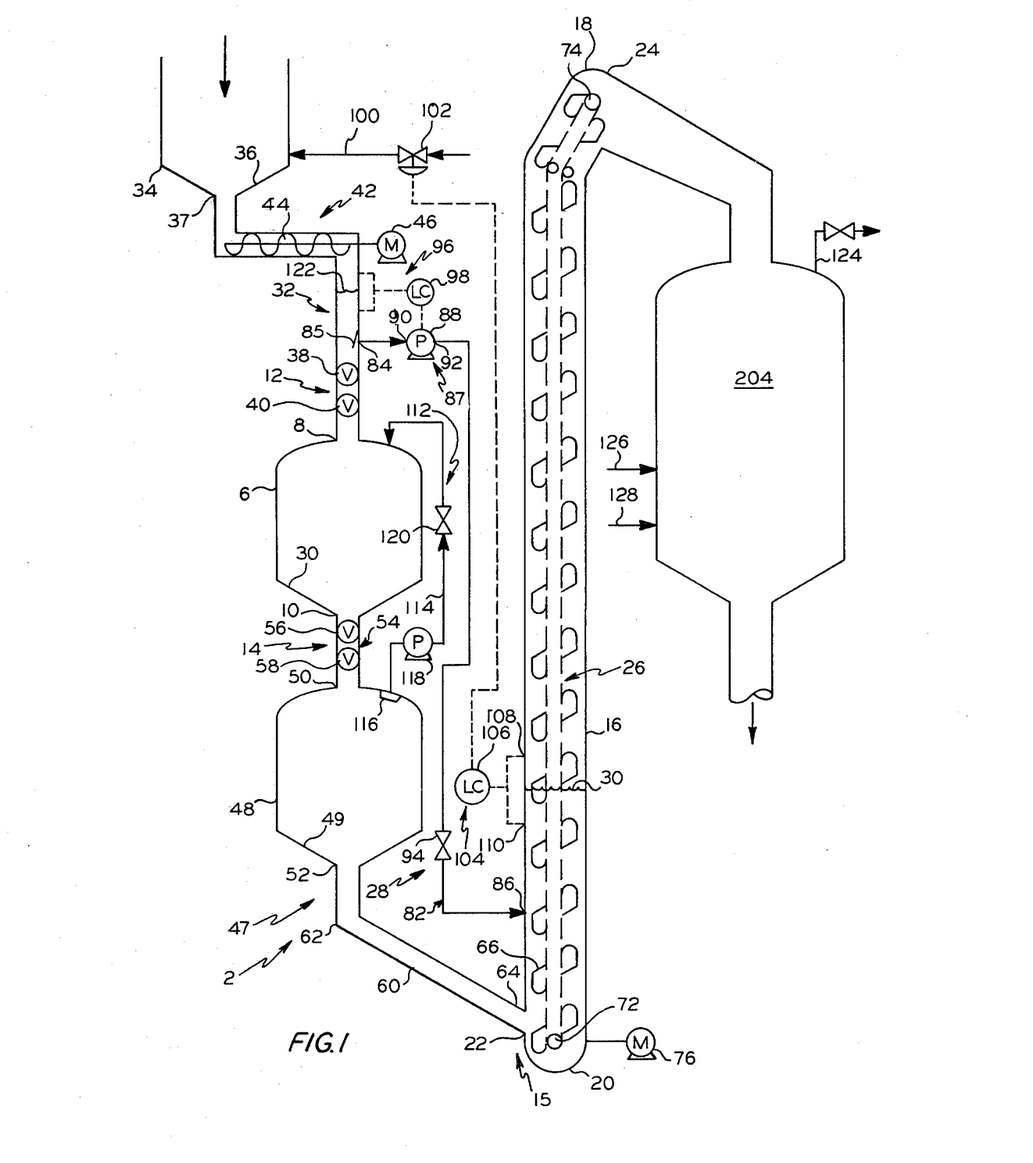
FIG. 1 illustrates in schematic certain features of the present invention.

With reference to FIG. 1, a means 2 for introducing a particulate material into a high pressure zone 204 comprises a sealable vessel 6 having an inlet 8 and an outlet 10; a first valve means 12 cooperating with the inlet 8 of the vessel 6; a second valve means 14 cooperating with the outlet 10 of the vessel 6; a conduit means 15 comprising an elevator housing 16 having an upper end 18, a lower end 20, an inlet 22, and an outlet 24, with the outlet 10 of the vessel 6 being in flow communication with the inlet 22 of the elevator housing 16 when the second valve means 14 is open, and the outlet 24 of the elevator housing 16 being positioned above the inlet 22 of the elevator housing 16; a means 26 cooperating with the elevator housing 16 for conveying a particulate material from the inlet 22 of the elevator housing 16 to the outlet 24; and, a means 28 for maintaining a liquid level 30 in the elevator housing 16 between the inlet 22 and the outlet 24. The elevator housing 26, the sealable vessel 6, the first valve means 12, the second valve means 14 and the conduit means 15 are constructed so as to be able to withstand the pressure of the high pressure zone 204. The sealable vessel 6 is preferably a lock hopper having a generally frustoconically downwardly converging interior bottom wall 30 which converges to the vessel outlet 10. The vessel inlet 8 is preferably positioned at an upper end of the vessel 8 preferably directly above the outlet 10 and opens along a longitudinal axis of the vessel 8. The first valve means 12 is preferably positioned in a conduit means 32 which establishes flow communication between the inlet 8 of the vessel 6 when the valve means 12 is open and a particulate reservoir 34, for example, a vessel such as an atmospheric hopper having a sloping bottom wall 36 sloping toward an outlet 37. Preferably, at least that portion of the conduit means 32 which is positioned adjacent the vessel 6 is generally vertically positioned.

Preferably, the first valve means 12 comprises a first valve 38 and a second valve 40 positioned in the vertical portion of the conduit means 32 with the second valve 40 being positioned between the first valve 38 and the vessel inlet 8. At least one of the valves 38 and 40 can at least substantially seal liquid in the vessel 6 at the pressure of the zone 204. Preferably, the second valve 40 forms the liquid seal. In this embodiment, the first valve 38, which does not necessarily form a liquid seal, is operated in the hereinafter described manner to preserve the sealing integrity of the valve 40. Further preferably, a means 42 for metering particulate material into the vessel 6, such as a star valve, an endless belt, or an auger 44 driven by a motor 46 is provided in the conduit means 32, preferably between the valve 38 and the particulate reservoir 34.

Preferably, a conduit means 47 connects the outlet 10 of vessel 6 with the inlet 22 of elevator housing 16. In the illustrated embodiment, the conduit means 47 comprises a second vessel 48 having a lower sloping interior wall 49, an inlet 50 and an outlet 52 preferably vertically aligned, with the outlet 52 being below the inlet 50 between the outlet 10 of the vessel 6 and the inlet 22 of the elevator housing 16. The vessel 48 serves as a surge between the vessel 6 and the elevator housing 16. The vessel 48 should be able to withstand the pressure in zone 204. The inlet 50 of the vessel 48 is connected to the outlet 10 of the vessel 6 via a conduit means 54 extending between outlet 10 and inlet 50 when the valve means 14 is open. The valvemeans 14 comprises a first valve 56 and a second valve 58 disposed in the conduit means 54, operating in the same manner as the first valve means 12. An inclined, enclosed ramp 60 having upper end 62 and a lower end 64 defines a flow path between the outlet 52 of the vessel 48 and the inlet 22 of the elevator housing 16, the upper end 62 being connected to the outlet 52 of the vessel 48, the lower end 64 being connected to the inlet 22 of the elevator housing 16.

The means 26 for conveying particulate material from the inlet 22 of the elevator housing to the outlet 24 usually will comprise a series of buckets 66 (see FIG. 2) mounted on an endless belt means 68, such as chain 70. Other means, such as a modified auger, as discussed hereinafter can be utilized if desired. The chain 70 is mounted on at least a first sprocket 72 mounted in the lower end 20 of the elevator housing 16 and a second sprocket 74 mounted in the upper end 18 of the elevator housing 16. A motor 76, for example, cooperating with the first sprocket 72, drives the endless chain 70. In the embodiment illustrated in FIG. 2, the buckets 66 are provided with apertures 78 through their bottoms 80. The apertures 78 are appropriately dimensioned sufficiently small so that most of the particles to be conveyed from the inlet 22 of the elevator housing to the outlet 24 will not pass by gravity therethrough, but sufficiently large and in sufficient number and placement so that liquid can readily drain from the buckets. That is, the means 26 preferably selectively conveys particulate material from the inlet 22 to the outlet 24 of the elevator housing 16. Another, device which can be useful in selectively conveying particulate comprises an endless chain-mat, not shown, revolving in an elongated eliptical fashion, similar to the apertured bucket ladder of FIG. 1, but about an inclined ramp. The buckets are formed by the links of the chain and the inclined ramp, and liquid can drain between the chain and the ramp, or through the ramp, if it is provided with apertures.

The means 28 for maintaining a liquid level in the bucket ladder housing preferably comprises a conduit means 82 which has a first end 84 which opens into the apparatus 2 upstream of the valve means 12 and second end 86 which opens into the apparatus 2 between the valve means 12 and the elevator outlet 24.

The second end 86 of conduit means 82 preferably empties into the elevator housing 16. The first end 84 of the conduit 82 opens into a liquid reservoir. The conduit means 82 thus establishes a flow path between a liquid reservoir and the elevator housing 16. In the illustrated embodiment, the conduit means 32 serves as a liquid reservoir. A baffle 85 positioned in the conduit means 32 protects the opening of the conduit means 82 at its first end 84 from solids flow thereinto. A means 87 for causing fluid flow from the liquid reservoir to the elevator housing is provided. In the embodiment illustrated, the means 87 comprises a pump 88 cooperating with the conduit means 82. The pump 88 has an inlet 90 which receives liquid from the liquid reservoir and an outlet 92 through which liquid is expelled at sufficient pressure to enter the elevator housing 16. The conduit means 82 is preferably provided with a means 94, such as a check valve, for preventing liquid flow through the conduit means 82 from the elevator housing 16. A means 96 such as a level control 98 is associated the conduit means 32 above the first end 84 of the conduit means 32 and the pump 88 for activating the pump 88 when a liquid level within the conduit means 32 reaches a predetermined level. Preferably, the means 96 also serves to deactivate the pump 88 when the liquid level in the conduit means 32 reaches another, lower predetermined level. Preferably a conduit 100 connected with a liquid reservoir not shown empties into the apparatus 2 above the valve means 12. A valve, preferably a motor valve 102 cooperates with the conduit means 100. A means 104, such as level control 106, is associated with the elevator housing 16 and the motor valve 102 for causing the motor valve to be manipulated in response to a liquid level in the elevator housing 16. In the illustrated embodiment, the level control is to cause the motor valve 102 to close when the liquid level in the elevator housing reaches a first position 108, and to cause the motor valve 102 to open when the liquid level in the elevator housing reaches a second lower position 110.

A means 112 for speeding passage of particulate material through the outlet 10 of the vessel 6 is desirably provided in the apparatus 2 of the present invention. For example, a conduit means 114 connects with an upper portion of the vessel 48 and an upper portion of the vessel 6 establishing flow communication therebetween. A screen 116 covers the opening of the conduit means 112 into the vessel 48. A pump means 118 for causing liquid flow from the vessel 48 to the vessel 6 cooperates with the conduit means 112. A valve 120 also cooperates with the conduit means 112.

Operation of the invention depicted in FIG. 1 is described as follows:

Vessel 6 is filled with liquid initially from line 100, for example. Valve means 14 and valve means 12 are closed. Valve means 12 is opened. Particulate material having a density greater than that of the liquid is passed downwardly through a first liquid level 122 in the liquid reservoir and into the vessel 6 through inlet 8. Preferably, the particulate material is metered into the vessel 6 from particulate reservoir 34 by metering means 42. Valve means 12 is then closed to seal the inlet 8 to the vessel 6. Preferably, valve 38 closes first, and then valve 40 closes, to mitigate particulate material interference with and wear on the mating surfaces of the valve 40. Valve means 14 is then opened, to unseal the vessel outlet. Preferably, the valves 56 and 58 are first cracked open, to prevent hydraulic hammer as the vessel 6 becomes pressurized, and then fully opened. Alternatively, valve 120 can be slowly opened, to pressurize the vessel 6. Particulate material is then transported through the outlet 10 of the vessel 6, through the conduit means 15 and upwards through the liquid level 30 and into the high pressure zone 204. The pressure of zone 204 acting on liquid level 30 serves to maintain the vessel 6 liquid full, in a manometer type fashion. When an apertured bucket ladder is employed to transport the particulate material upwardly through the second liquid level, the energy requirements for feeding the high pressure zone are greatly reduced, and the introduction of liquid into the high pressure zone substantially avoided. The liquid selected should have a density less than that of the particulate material to be conveyed, should not dissolve excessive amounts of the particulate material, and should not excessively vaporize at the temperature and pressure maintained in the elevator housing. Water or heavy liquid hydrocarbons, such as middle distillate for example from an oil shale retort are suitable. Water is preferred because it is inexpensive.

As particulate material is passed downwardly through the liquid level 122 and into the vessel 6 though the inlet 8 liquid is displaced by the particulate material and withdrawn from the vessel 6 and into the conduit means 32, causing level 122 to rise.

The volume of liquid displaced is about equal to the displacement volume of particulate material fed into the vessel 6. To prevent depletion of the liquid in the apparatus 2, an amount of liquid about equal to that which is withdrawn, or overflows, from the vessel 6 is introduced into the conduit means 15. This liquid must be at at least as high a pressure as zone 204.

In the embodiment illustrated in FIG. 1, the rising liquid level in the conduit 32 causes pump 88 to become activated due to a signal from level control 98, and the displaced liquid from the vessel 6 is recycled to the elevator housing 16. To compensate for possible liquid loss from the apparatus 2 and into the high pressure zone 204, level controller 106 detects an undesirably low liquid level 30 in the elevator housing 16 and causes valve 102 to open. Make up liquid is introduced into the system, preferably, in a manner so as to cause liquid level 122 to rise, such as by being introduced into the particulate reservoir 34. Pump 88 thus also becomes activated in response to a system need for make-up liquid or in response to a leaking valve means 12 or 14.

Preferably, the particulate material is filtered from the liquid as it is transported upwards through the liquid level 30 in elevator housing 16, so as to avoid unnecessary energy expenditure in lifting the liquid and the introduction of substantial amounts of liquid in the high pressure zone 204. In the embodiment illustrated in FIGS. 1 and 2 the liquid drains through the apertures in the buckets.

To speed the passage of particulate material through the outlet 10 of the vessel 6, it is desirable to activate pump 118 when valve means 14 is in the open position. Liquid from the conduit means 15 is introduced into the vessel 6 via conduit means 114 and circulates through the vessel 6 toward the outlet 10, cocurrent with the flow of particulate, thereby speeding transport of particulate material through the outlet 10. After the desired amount of particulate material, preferably substantially all of the particulate material contained in the vessel 6 has passed through the outlet 10, pump 118 is deactivated, valve 120 is closed, valve 58 is closed, and valve 56 is closed, preferably before valve 58. The vessel 6 is sealed and filled with substantially incompressible medium, most of which is liquid. Valve means 12 can then be opened, preferably first cracked open to allow a gradual depressurization, and the vessel 6 again charged with particulate material and the cycle repeated as desired.

Preferably, the particulate material which passes through the outlet 10 enters the vessel 48, which serves as a surge for the elevator means 26. When a bucket ladder or the like is employed as the elevator means 26, the particulate material is metered from the vessel 48 at a rate substantially independent of the amount of particulate material contained in the vessel 48, and fed to the high pressure zone 204. Thus, only one apparatus 2 is necessary to provide continuous feed to the high pressure zone 204.

In a preferred embodiment, the particulate material comprises crushed oil shale, at least a portion of which preferably has a particle size within the range of from about 1/16 inch to 4 inches. In this embodiment, the zone 204 is an oil shale retort, maintained at a pressure of from about 2 to about 2000 psig (13.7–13,700 KPa) and a temperature of from about 500° to about 1500° F. (260°–815° C.). Gaseous and aerosol product is withdrawn overhead from the zone 204, via line 124. Hot gases or combustion supporting gas, preferably the latter, is introduced into the retort via the line 126. Cool light gas, such as methane or hydrogen, preferably the latter is introduced into the retort via the line 128. One reason that hydrogen is referred is that it is a good heat sink, and removes heat from the spent shale by intimate countercurrent contact. Another reason is that by operating the retort at a long shale residence time, for example, from 15 to 150 minutes, a hydrogen partial pressure of at least 300 psig (2055 KPa), a retort pressure of from 300–1000 psig (2055–6850 KPa), and a maximum temperature of from 900°–1400° F. (482°–760° C.), yields of hydrocarbon products can be enhanced. Preferably, a sufficient amount of hydrogen or other light gas is introduced into the retort to reduce the temperature of the spent shale to between about 100° and 200° F. (37.8°–93.3° C.).

Figures 2, 3:
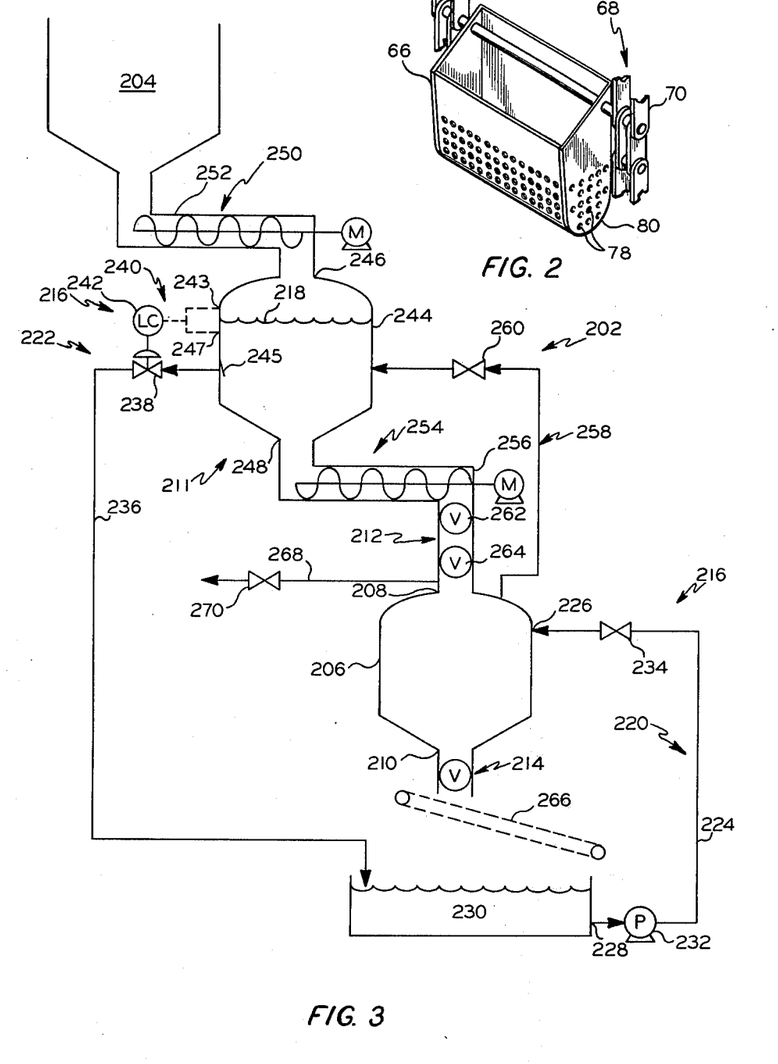
FIG. 2 illustrates pictorially a portion of the apparatus of FIG. 1.
FIG. 3 illustrates in schematic certain other features of the present invention.

With reference to FIG. 3, a means 202 for withdrawing a particulate material from a high pressure zone 204 comprises a sealable vessel 206 having an inlet 208 and an outlet 210; a first conduit means 211 connected to the inlet 208 of the vessel 206; a first valve means 212 cooperating with the inlet 208 of the vessel 206; a second valve means 214 cooperating with the outlet 210 of the vessel 206, and a means 216 for maintaining a liquid level 218 in the conduit means 211.

In a preferred embodiment, the means 216 comprises a second means 220 for introducing liquid into the vessel 206 and a means 222 for withdrawing liquid from the conduit means 211. Preferably, the means 220 comprises a conduit 224 having a first end 226 emptying into the vessel 206 and a second end 228 in open communication with a liquid reservoir 230. A means for inducing fluid flow from the liquid reservoir 230 through the conduit 224 and into the vessel 206, such as pump 232, is preferably associated with the conduit 224. A valve means 234 is associated with the conduit 224.

The means 222 for withdrawing liquid from the conduit means 211 preferably comprises a third conduit means 236 connected to the conduit means 211 outside of the vessel 206. The valve means 212 is disposed in the conduit means 211 between the point of connection of the conduit means 236 and the vessel 206. In the illustrated embodiment, the conduit means 236 empties into the liquid reservoir 230 for recycle of liquid to the vessel 206. A fourth valve means 238 such as a motor valve is associated with the conduit 236. A means 240, such as a level control 242, is associated with the valve means 238 and the conduit means 211 for opening the valve means 238 in response to the liquid level 218 reaching a predetermined position 243 in the conduit means 211. Preferably, the level control 242 is operable to close the valve 238 in response to the liquid level 218 reaching a second predetermined position 247 in the conduit means 211 below the first predetermined position.

Preferably, the conduit means 211 comprises a second vessel 244, having an upper inlet 246 and a lower outlet 248. The conduit means 236 is connected to the vessel 244, between the inlet 246 and the outlet 248 and the means 240 is associated with the vessel 244, between the inlet 246 and the outlet 248. Preferably, the inlet to the conduit means 236 is covered with a filter means, such as a baffle 245. A means 250 for metering particulate into the vessel 244 from a reservoir for particulate material, such as the high pressure zone 204, for example, an auger 252 is associated with the inlet 246 of the vessel 244. The high pressure zone 204 is connected to the inlet 246 of the vessel 244.

Preferably a means 254 for metering particulate material such as an auger 256 is associated with the outlet 248 of the vessel 244. An auger is advantageous because it also serves to speed particulate flow between the vessel 244 and the vessel 206. To further speed transfer of particulate between the vessel 244 and the vessel 206, a conduit means 258 having a valve means 260 associated therewith establishes a liquid flow path between the vessel 206 and the vessel 244 which bypasses the auger 256. Preferably, a screen (not shown) covers the inlet to the conduit means 258 from the vessel 206, preferably, in an upper portion of the vessel 206.

The valve means 212 preferably comprises an upper first valve 262 and a lower second valve 264. The first valve is utilized to avoid excessive exposure of the second valve to particulate material. A screen conveyor 266 is positioned between the outlet 210 of the vessel 206 and the liquid reservoir 230.

Operation of the apparatus shown by FIG. 3 can be as follows. The vessel 206 is filled with liquid, such as liquid from reservoir 230 via the line 224, valve 234 being open, valve means 212 and 214 being closed. Displaced gases can be withdrawn from the vessel 206 via a line 268 communicating with an upper portion of the vessel 206 and having a valve 270 positioned therein, the valve 270 being in the open position. When the vessel 206 is substantially full, preferably essentially completely full of liquid, valves 234 and 270 are closed and pump 232 deactivated, thus sealing the vessel 206. The inlet 208 to the vessel 206 is then opened, preferably, by first partially opening the valve means 212, then completely opening the valve means 212. Alternatively, the valve means 260 can be slowly opened to pressurize the vessel. Particulate material from the high pressure zone 204 having a density greater than that of the liquid in the vessel 206 is passed through the conduit means 211 and inlet 208 and into the vessel 206. Preferably, the particulate is metered into the vessel 206 via auger 256 from vessel 244 which serves as a surge zone for particulate from the high pressure zone 204. Particulate is preferably metered continuously from the high pressure zone 204 and into vessel 244.

As particulate material from the high pressure zone 204 is introduced into the vessel 206, a portion of the liquid in the vessel 206 about equal to the displacement volume of the particulate is displaced from the vessel 206 and causes liquid level 218 in the conduit means 211 to rise. Preferably, at least a portion of the liquid displaced from the vessel 206 flows through the conduit 258, valve 260 being opened for the occasion, thereby lowering the pressure drop across the auger 256 and speeding the rate of particulate introduction into the vessel 206. The pressure generated by the auger 256 thus causes liquid to be introduced into the vessel 244 from the vessel 206 via means 258 and be circulated toward the inlet 208 as particulate material passes therethrough.

The rise in liquid level 218 is detected by level control 242 which opens valve 238, thereby resulting in the withdrawal of an amount of liquid from the conduit means 211 which is about equal to the amount of liquid displaced from the vessel 206 by the descending particulate. The liquid level 218 in the conduit means 211 is thus maintained between an upper and a lower limit. The level control 242 causes valve 238 to close when the liquid level 218 reaches the lower limit.

When the desired amount of particulate has been charged to the vessel 206, inlet 208 is closed, preferably by first closing valve 262 and then valve 264. Valve 260 is also closed and auger 256 deactivated. The vessel 206 is thus sealed and filled completely with a mixture of particulate material and liquid and is at the same pressure as high pressure zone 204. The outlet 210 of the vessel 206 is then opened preferably by slowly opening valve means 214 and at least substantially all the contents of the vessel 206 which comprise a mixture of liquid and particulate allowed to pass through from the vessel 206. Preferably, the contents of the vessel 206 fall on conveyor 266, which is preferably an endless moving screen. The liquid passes through the screen and into the reservoir 230 and is thus separated from the particulate for recycle and the particulate transported away on the conveyor as desired. Valve means 214 can then be closed and valves 234 and 270 opened to begin a repeat of the cycle.

In this embodiment, the particulate material preferably comprises oil shale at least a portion of which has a particle size within the range of from ¼ inch to about 4 inches and which has been retorted and then cooled in the zone 204 to a temperature of about 300° F. (149° C.)

or less. A major portion of the liquid preferably comprises water. The retort can be maintained at a pressure of from about 2 to about 2000 psig (13.7–12,700 KPa), or higher, by utilizing the withdrawal system hereinabove described. Advantages of the system include the maintenance of reactor pressure and the avoidance of the need of pumps capable of generating a high pressure increase.

Figure 4:
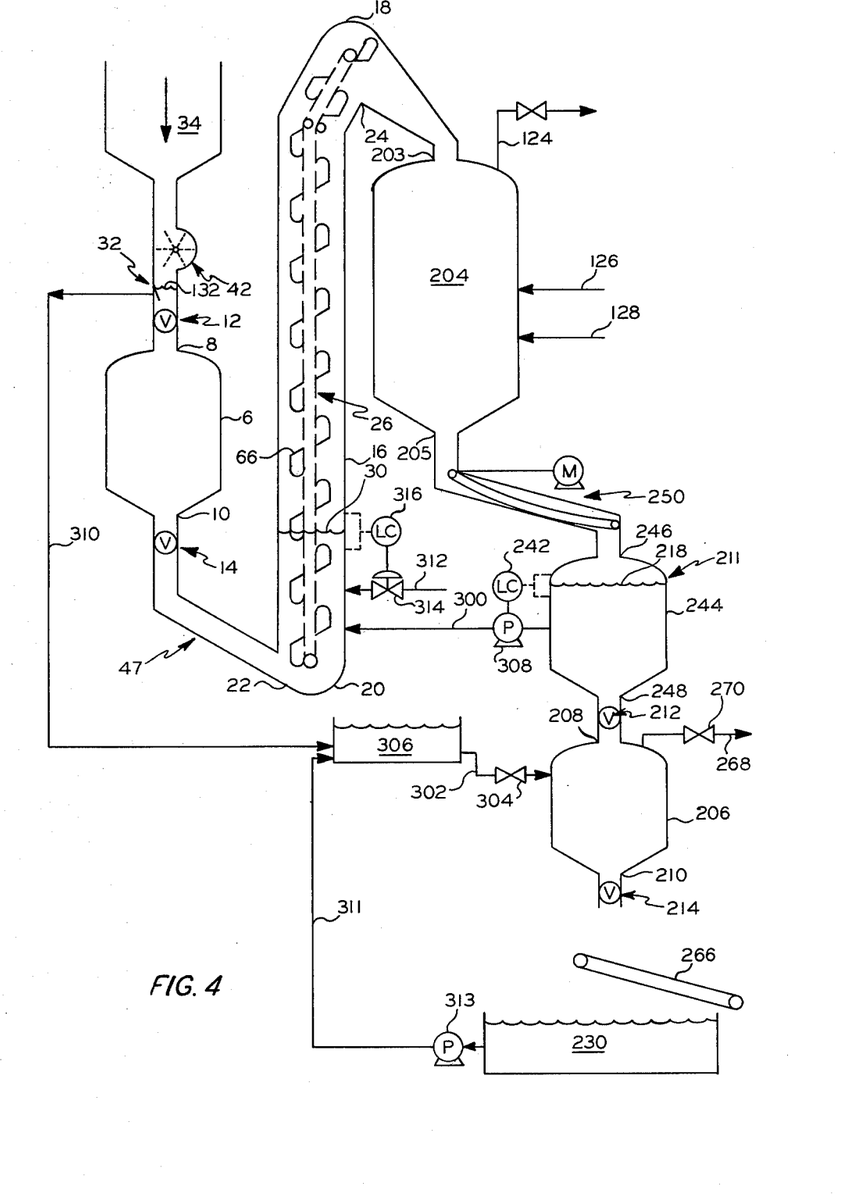
FIG. 4 illustrates in schematic certain features of another aspect of the invention, exhibiting features from FIGS. 1 and 3.
Figure 5:
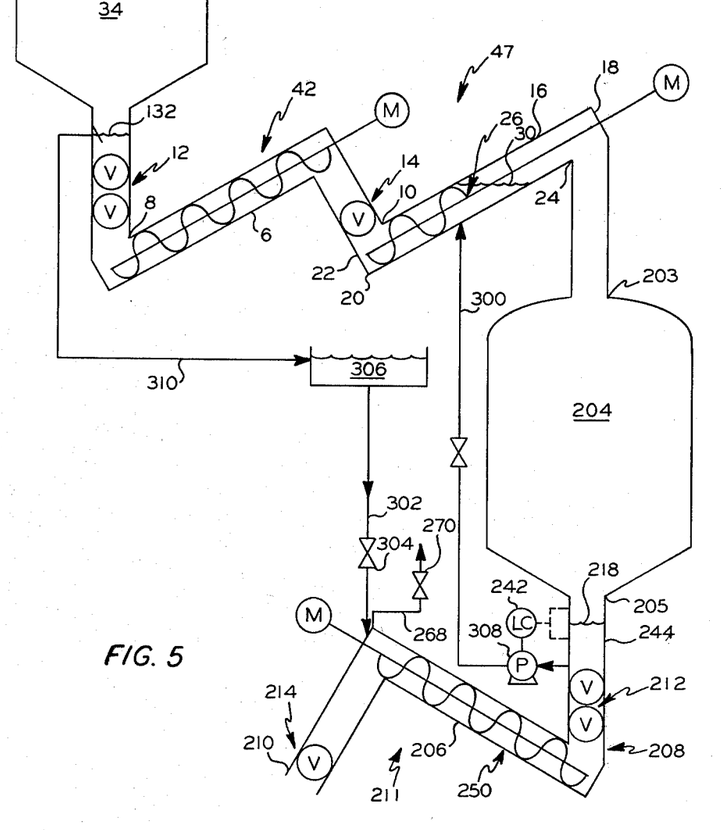
FIG. 5 illustrates in schematic certain features of another embodiment of the aspect of the present invention shown in FIG. 4.

FIG. 4 illustrates one manner by which the lock hopper systems of FIGS. 1 and 3 can be joined together. FIG. 5 illustrates another embodiment of the invention shown by FIG. 4. Certain details shown by FIGS. 1, 2 and 3 have been eliminated for simplicity. Like reference numerals have been utilized where appropriate. The apparatus of FIGS. 4 and 5 comprises a vessel 6 having an inlet 8 and an outlet 10. A valve means 12 is associated with the inlet 8 of the vessel 6, and a valve means 14 associated with the outlet 10. A conduit means 47 including an elevator housing 16 having an upper end 18, a lower end 20, an inlet 22, and an outlet 24 is positioned with the inlet 22 of the elevator housing 16 being in flow communication with the outlet 10 of the vessel 6. A means 26 is associated with the interior of the elevator housing 16, for conveying a particulate material from the inlet 22 of the elevator housing 16 to the outlet 24. A vessel 204 having an upper inlet 203 and a lower outlet 205 is positioned with its inlet 203 in flow communication with the outlet 24 of the elevator housing. A vessel 206 having an inlet 208 and an outlet 210 has its inlet 208 connected to and in flow communication with the outlet 205 of the vessel 204 by a conduit means 211. A valve means 212 is associated with the inlet 208 of the vessel 206. A valve means 214 is associated with the outlet 210 of the vessel 206. A conduit means 300 establishes communication between the conduit means 211 and the elevator housing 16, bypassing the vessel 204.

Preferably, a conduit means 302 having a valve means 304 positioned therein connects a liquid reservoir 306 with the vessel 206. The reservoir 306 is positioned to gravity feed into the vessel 206. A conduit 310 connected to the conduit means 32 and the reservoir 306 recycles displaced fluid from the vessel 8 to the reservoir 306. In FIG. 4, a conduit means 311 has pump means 313 associated therewith connects reserviours 230 and 306 for fluid recycle. A reservoir 34 for particulate material is in flow communication with the inlet 8 of the vessel 6, preferably, so as to gravity feed particulate into the vessel 6.

Preferably, in the embodiment shown by FIG. 4 the apparatus is provided with a means 42 for metering particulate material from the reservoir 34 and into the vessel 6. In FIG. 4, the means 42 comprises a star valve, and in FIG. 5, the means 42 comprises an inclined auger. The apparatus is also preferably provided with a means 250 for metering particulate material from the outlet 205 of the vessel 204. In FIG. 4, the means 250 comprises a driven endless chain mat, which is an advantageous means from the standpoint of energy conservation. In FIG. 5, the means 250 comprises an inclined auger.

In the embodiment shown in FIG. 4, it is preferred that the conduit means 211 comprise a vessel 244 having an inlet 246 in flow communication with the outlet 205 of the vessel 204 and an outlet 248 connected to the with the inlet 208 of the vessel 206. This feature can be included in the apparatus of FIG. 5 if desired, with a metering device positioned between it and the vessel 204. When the vessel 244 is utilized, the conduit means 300 preferably connects the vessel 244 with the elevator housing 16.

If allowance is not made so that liquid from the vessel 244 will gravity feed via the conduit means 300 into the elevator housing 16, it is necessary to provide a pump means 308 associated with the conduit means 300 to cause liquid flow from the conduit means 211, preferably vessel 244, to the elevator housing 16. As shown, the pump means 308 is activated and deactivated by level control 242 in response to a liquid level 218 in the vessel 244 reaching predetermined limits.

Preferably, a bleed line 268 having a valve 270 positioned therein communicates with an upper portion of the vessel 206 to facilitate filling of the vessel 206 with liquid.

A primary difference between the apparatus of FIGS. 4 and 5 lies in the structure of the vessels 6 and 206. In FIG. 5, the vessels 6 and 206 are generally tubular and have the shape of an inverted "V". Augers convey particulate material up the upstream leg of the V and it feeds by gravity into the downstream leg.

Operation of the apparatus as shown by FIGS. 4 and 5 is as follows:

The vessel 206 is at least substantially filled with liquid, which can be introduced via line 302 for example. Valve 304 and optionally 270 are open. Valve means 212 and 214 are closed. When filling has been completed, valves 304 and 270 are closed, and valve means 212 at least cracked opened, to pressurize the liquid in the vessel 206 due to the pressure in vessel 204 acting on liquid level 218. Particulate material is then fed into the vessel 206 from vessel 204, displacing, due to its greater density, a portion of the liquid from the vessel 206. This displaced portion of the liquid, which is at about the pressure of vessel 204, is conveyed to the vessel 6, to at least partially replenish liquid overflow (310) from the vessel 6 during its operation. During this step, valve means 14 is preferably open and valve means 12 is closed. In the embodiment illustrated, conduit 300 carries displaced liquid from the vessel 244 and introduces it into the conduit means 47 downstream with regard to particulate flow, from the vessel 6. Valve means 14 is then closed, and valve means 12 at least cracked open, to depressurize the liquid in the vessel 6. Particulate material having a density greater than that of the liquid is then introduced into the vessel 6 to displace a portion of the liquid from the vessel 6. Displaced liquid at level 132 from the vessel 6 can be withdrawn from the conduit 310 above the vessel 6 and conveyed to the reservoir 306 for recycle by a gravity feed line 310, if desired.

The flow of particulate material is generally countercurrent to that of the liquid. Generally, valve means 12 can be closed and valve means 14 opened and particulate material withdrawn from the vessel 6, by elevator means 26 for example. The particulate material can then be transported through a high pressure zone, such as a retort in the vessel 204, and introduced into the vessel 206, to displace a portion of the liquid therefrom.

It is important to note that this aspect of the invention is characterized by a liquid level 30 upstream of the vessel 204 and a liquid level 218 downstream of the vessel 204, to liquid seal both ends of the vessel 204. Operation of the inlet and outlet lock hoppers is preferably coordinated so that the volume between the liquid levels is maintained constant, so as to avoid pressure fluctuations in the vessel 204. The particulate material is transported upwardly through the liquid level 30 and downwardly through the liquid level 218 during transport between the vessel 6 and the vessel 206. It is advantageous to filter (or strain) the particulate from the liquid after it is transported upwardly through the liquid level 30 to avoid the introduction of excessive amounts of liquid into the vessel 204.

Particulate material is removed from the system by closing the valve means 212, thus sealing the vessel 206 from the vessel 204, and opening the valve means 214 to exhaust a mixture of liquid and particulate material from the vessel 206. Valve means 214 can then be closed and valves 304 and 270 opened to repeat the cycle.

If shrinkage of the particulate material occurs during its passage through the vessel 204, make-up liquid can be added to the conduit means 47 as necessary. In FIG. 4, for example, make-up liquid can be added to the elevator housing 16 via line 312 having valve 314 associated therewith. Line 312 is connected to a high pressure source of liquid, not shown. Introduction of make-up liquid can be automatically controlled, if desired, such as by utilizing a level control 316 to detect the position of liquid level 30 in the elevator housing 16 and manipulate the valve 314 in response to the detected position.

Figure 6:
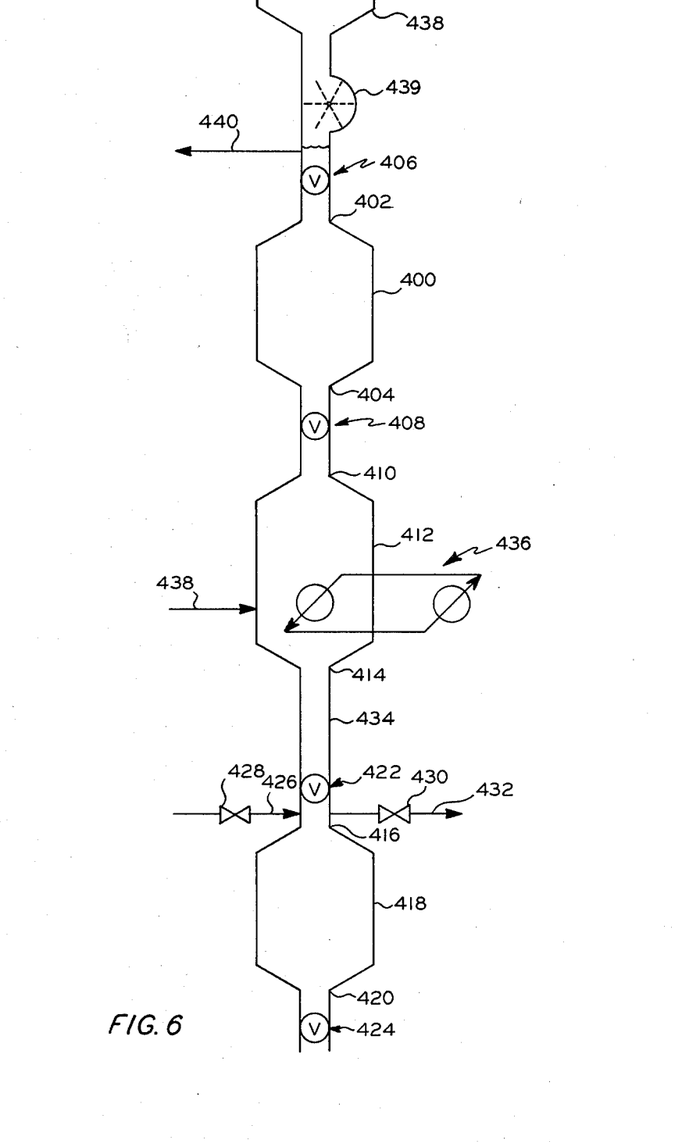
FIG. 6 illustrates in schematic certain features of yet another embodiment of the present invention.

FIG. 6 shows one manner in which a liquid sealed lock hopper system can be utilized in an extraction process.

With reference FIG. 6, the apparatus comprises a first vessel 400 serving as an inlet lock hopper having an inlet 402 and an outlet 404. A first valve means 406 cooperates with the inlet and a second valve means 408 cooperates with the outlet. The outlet 404 is connected to an inlet 410 of a second vessel 412 which serves as the extraction zone which also has an outlet 414. The outlet 414 of the vessel 412 is connected to an inlet 416 of a vessel 418 having an outlet 420. The vessel 418 serves as an outlet lock hopper. A valve means 422 cooperates with the inlet 416 and a valve means 424 cooperates with the outlet 420 of the vessel 418.

In operation of the apparatus the valve means 424 is opened and a mixture of liquid and particulate exhausted from the vessel 418. The liquid is then preferably filtered from the particulate for liquid recycle. Valve means 424 is closed and liquid charged to the vessel 418 via a line 426 having a valve 428 associated therewith, the line 426 being connected to a liquid reservoir not shown. A valve 430 in bleed line 432 is preferably also opened to allow gases to be displaced from the vessel 418 as it becomes liquid filled. Valves 428 and 430 are then closed, and valve means 422 is opened. Particulate material having a density greater than that of the liquid settles from the vessel 412 and into the vessel 418. A portion of the liquid in the vessel 418 is displaced by the falling particulate and enters the vessel 412. It is preferable to avoid excessive turbulance during this transfer stage so that an excessive amount of liquid from the vessel 412 is not carried into the vessel 418, and a good countercurrent flow pattern between particulate and solvent maintained. Where the contents of the vessel 412 are hot and the liquid charged to vessel 418 is cool, it is advantageous to employ a standpipe or standleg 434 between the vessel 412 and the vessel 418, to recover at least a portion of the heat contained within the descending particulate by intimate countercurrent contact between the descending particulate and the ascending liquid, for as long a time period as is feasible.

A heat exchange means 436 is associated with a lower portion of the vessel 436 to supply heat, if necessary, in an amount to maintain the desired temperature in the vessel 412. Make-up liquid, if necessary, is added to the vessel 412 in an amount to maintain the desired pressure in the vessel 412 via a valved line 438. It should be noted that the vessel 412 is essentially completely filled with a mixture of ascending liquid and descending particulate, the mixture being liquid rich near an upper portion of the vessel 412, and particulate-rich near a lower portion of the vessel 412.

The valve means 408 is opened to introduce particulate into and withdraw liquid from the vessel 412. When the particulate material from the vessel 400 has descended into the vessel 412, the valve means 408 is closed, sealing the vessel 400. At this step, the vessel 400 is essentially completely full of liquid, at a temperature somewhat lower than that of the vessel 412, due to direct contact of the liquid with cool particulate. The valve means 406 is then cracked open, allowing flashing, if any, of a portion of the liquid to occur. If flashing occurs, it is desirable that a standleg 438 for a cool particulate be positioned above the valve means 406, to provide for condensation of the vapors on the cool particulate and for preheat of the particulate. Valve means 406 is then opened completely, and a charge of particulate received into the vessel 400 from the standleg 438. Preferably, the particulate is metered into the vessel 400, such as via suitable means such as star valve 439. Liquid which is displaced from the vessel 400 by the descending particulate is withdrawn from the standleg 438 by a line 440 for further processing such as recovery of the desired components of the liquid for recycle.

Advantages of the apparatus shown in FIG. 6 include liquid sealed valves, the absence of high pressure, high capacity pumps, and full countercurrent flow between particulate and liquid.

Preferably, the particulate comprises a material containing extractable bitumen, such as coal, oil shale or tar sand, and the liquid comprises a solvent suitable for extracting the bitumen under the conditions found in vessel 412, such as water, paraffinic hydrocarbons having from about 3 to about 10 carbon atoms, and aromatic hydrocarbons having from about 6 to about 10 carbon atoms.

While there have been described certain preferred features of the present invention, it is not to be construed as so limited, except to the extent that such limitations are found in the claims.

What is claimed is:

1. Apparatus comprising:
   (a) a first sealable vessel having an inlet and an outlet;
   (b) a first valve means associated with the inlet of the first sealable vessel;
   (c) a second valve means associated with the outlet of the first sealable vessel;
   (d) an elevator housing having an inlet and an outlet, with the outlet of the elevator housing being positioned above the inlet of the elevator housing, with the outlet of the first sealable vessel being in flow communication with the inlet of the elevator housing;
   (e) a means cooperating with the elevator housing for selectively conveying a particulate material from the inlet of the elevator housing to the outlet of the elevator housing; and
   (f) a means for maintaining a liquid level in said elevator housing between the inlet of the elevator housing and the outlet of the elevator housing, said means for maintaining a liquid level comprising a first conduit means bypassing the first sealable vessel and establishing a flow path between the inlet of the first sealable vessel and the elevator housing.

2. Apparatus comprising:
(a) a first sealable vessel having an inlet and an outlet;
(b) a first valve means associated with the inlet of the first sealable vessel;
(c) a second valve means associated with the outlet of the first sealable vessel;
(d) an elevator housing having an inlet and an outlet, with the outlet of the elevator housing being positioned above the inlet of the elevator housing, with the outlet of the first sealable vessel being in flow communication with the inlet of the elevator housing;
(e) a means cooperating with the elevator housing for selectively conveying a particulate material from the inlet of the elevator housing to the outlet of the elevator housing;
(f) a means for maintaining a liquid level in said elevator housing between the inlet of the elevator housing and the outlet of the elevator housing, said means for maintaining a liquid level comprising a first conduit means bypassing the first sealable vessel and establishing a flow path between the inlet of the first sealable vessel and the elevator housing;
(g) a second vessel having an inlet and an outlet, the outlet of the second vessel being below the inlet of the second vessel;
(h) a second conduit means establishing communication between the outlet of the second vessel and the inlet of the first vessel; and
(i) a means cooperating with the second conduit means for metering particulate material from the outlet of the second vessel;
wherein the first conduit means forms a flow path between the second conduit means and the elevator housing.

3. Apparatus as in claim 2 wherein the first conduit means further comprises a pump cooperating with the first conduit means operable for pumping liquid through the first conduit means from the second conduit means to the elevator housing, and a third valve means operable for preventing liquid flow from the elevator housing to the second conduit means.

4. Apparatus as in claim 3 further comprising a means associated with the second conduit for activating the pump when a liquid level within the second conduit means reaches a predetermined position.

5. Apparatus as in claim 4 further comprising a third vessel having an inlet and an outlet with its inlet positioned to receive particulate material from the outlet of the first vessel; and, an inclined enclosed ramp having an upper end and a lower end with its upper end positioned to receive particulate material from the outlet of the third vessel and its lower end positioned to pass particulate material to the inlet of the elevator housing.

6. Apparatus as in claim 5 further comprising a third cnduit means forming a flow path between an upper portion of the third vessel and an upper portion of the first vessel, said third conduit means including a pump operable for selectively causing liquid flow from the third vessel to the first vessel and a fourth valve means operable for selectively preventing fluid flow from the third vessel to the first vessel.

7. Apparatus comprising:
(a) a first vessel having an inlet and an outlet;
(b) a first conduit means connected to the inlet of the first vessel;
(c) a first valve means associated with the inlet of the first vessel;
(d) a second valve means associated with the outlet of the first vessel;
(e) a second conduit means opening into the first vessel, said second conduit means having a third valve means associated therewith;
(f) a third conduit means connected to the first conduit means, the first valve means being positioned between the third conduit means and the first vessel;
(g) a fourth valve means associated with the third conduit means; and
(h) a means associated with the first conduit means and the fourth valve means for opening the fourth valve means in response to a liquid level reaching a predetermined position in the first conduit means.

8. Apparatus as in claim 7 wherein the first conduit means comprises
(a) a second vessel having an inlet and an outlet, the outlet of the second vessel being below the inlet of the second vessel; said outlet of the second vessel being positioned to pass particulate material to the inlet of the first vessel; and
(b) a means associated with the inlet of the second vessel for metering particulate material into the second vessel; wherein the third conduit means communicates with the second vessel between its inlet and its outlet; and the means for opening the fourth valve is associated with the second vessel between the inlet of the second vessel and the outlet of the second vessel.

9. Apparatus as in claim 8 further comprising
(a) a liquid reservoir positioned in flow communication with the first vessel through the second conduit means; and
(b) a particulate reservoir positioned in flow communication with the inlet of second vessel.

10. Apparatus as in claim 9 further comprising
(a) a means associated with the outlet of the second vessel for metering particulate from the outlet of the second vessel;
(b) a fourth conduit means forming a flow path between the first vessel and the second vessel; and
(c) a fifth valve means associated with the fourth conduit means for preventing fluid flow from the second vessel to the first vessel.

11. Apparatus as in claim 10 wherein the fourth conduit means forms a flow path between the second vessel and an upper portion of the first vessel.

12. Apparatus comprising:
(a) a first vessel having an inlet and an outlet;
(b) a first valve means associated with the inlet of the first vessel;
(c) a second valve means associated with the outlet of the first vessel;
(d) an elevator housing having an upper end, an inlet, and an outlet between the inlet and the upper end, with the inlet of the elevator housing in flow communication with the outlet of the first vessel;
(e) a means associated with the interior of the elevator housing for conveying a particulate material from the inlet of the elevator housing to the outlet of the elevator housing;
(f) a second vessel having an inlet and an outlet, the outlet of the second vessel being below the inlet of the second vessel with the inlet of the second vessel being in flow communication with the outlet of the elevator housing;

(g) a third vessel having an inlet and an outlet;

(h) a first conduit means establishing flow communication between the outlet of the second vessel and the inlet of the third vessel; said second vessel forming a first flow path between the first conduit means and the elevator housing;

(i) a third valve means associated with the inlet of the third vessel;

(j) a fourth valve means associated with the outlet of the third vessel;

(k) a second conduit means establishing flow communication between the first conduit means and the elevator housing and forming a second flow path between the first conduit means and the elevator housing;

(l) a liquid reservoir;

(m) a third conduit means establishing flow communication between the liquid reservoir and the third vessel;

(n) a fifth valve means associated with the third conduit means; and (o) a reservoir for particulate material positioned in flow communication with the inlet of the first vessel.

13. Apparatus as in claim 12 further comprising
(a) a first means for metering particulate material from the reservoir for particulate material and into the first vessel; and
(b) a second means for metering particulate material from the outlet of the second vessel.

14. Apparatus comprising:
(a) a first vessel having an inlet and an outlet;
(b) a first valve means associated with the inlet of the first vessel;
(c) a second valve means associated with the outlet of the first vessel;
(d) an elevator housing having an upper end, an inlet, and an outlet between the inlet and the upper end, with the inlet of the elevator housing in flow communication with the outlet of the first vessel;
(e) a means associated with the interior of the elevator housing for conveying a particulate material from the inlet of the elevator housing to the outlet of the elevator housing;
(f) a second vessel having an inlet and an outlet, the outlet of the second vessel being below the inlet of the second vessel with the inlet of the second vessel being in flow communication with the outlet of the elevator housing;
(g) a third vessel having an inlet and an outlet;
(h) a first conduit means establishing flow communication between the outlet of the second vessel and the inlet of the third vessel; said second vessel forming a first flow path between the first conduit means and the elevator housing;
(i) a third valve means associated with the inlet of the third vessel;
(j) a fourth valve means associated with the outlet of the third vessel;
(k) a second conduit means forming a flow path between the first conduit means and the elevator housing, said second conduit means forming a second flow path between the first conduit means and the elevator housings;
(l) a liquid reservoir;

(m) a third conduit means establishing flow communication between the liquid reservoir and the third vessel;

(n) a fifth valve means associated with the third conduit means;

(o) a reservoir for particulate material positioned in flow communication with the inlet of the first vessel;

(p) a first means for metering particulate material from the reservoir for particulate material and into the first vessel;

(q) a second means for metering particulate material from the outlet of the second vessel;

wherein the second conduit means comprises a fourth vessel having an inlet positioned to receive particulate material from the outlet of the second vessel and an outlet positioned to pass particulate material to the inlet of the third vessel; and wherein the second conduit means opens into the fourth vessel and the elevator housing.

15. Apparatus as in claim 19 further comprising a pump associated with the second conduit means operable for causing liquid flow from the fourth vessel and into the elevator housing.

16. Apparatus as in claim 15 further comprising a fourth conduit means communicating with an upper portion of the third vessel and a sixth valve means associated with the fourth conduit means.

17. A process comprising
(a) opening an inlet to a liquid-filled vessel
(b) passing a particulate material having a density greater than that of the liquid downward through a first liquid level and into the vessel through the open inlet;
(c) withdrawing liquid from said vessel as said particulate material is passed into said vessel through said open inlet;
(d) closing the vessel inlet;
(e) opening an outlet from said vessel;
(f) transporting the particulate material through the outlet of the vessel, through a conduit means, upwards through a second liquid level maintained in said conduit means, and into a high pressure zone; and
(g) introducing liquid into said conduit means in an amount about equal to the amount of liquid withdrawn from the vessel.

18. A process as in claim 17 further comprising filtering the particulate material from the liquid as the particulate material is transported upwards through the second liquid level.

19. A process as in claim 18 further comprising introducing liquid into the vessel from the conduit means and circulating said introduced liquid toward the outlet as particulate material is transported through the outlet.

20. A process as in claim 19 wherein the particulate material comprises oil shale at least a portion of which has a particle size within the range of ¼ inch to 4 inches, wherein the liquid comprises water, wherein the particulate material is metered through the inlet and the outlet of the vessel, and wherein the high pressure zone has a pressure within the range of from about 20 to about 2000 pounds per square inch absolute; and wherein at least a portion of the liquid which is withdrawn from the vessel is introduced into the conduit means.

21. A process comprising
(a) at least substantially filling a vessel with a liquid;
(b) sealing the vessel;

(c) opening an inlet to said vessel, said inlet being in flow communication via a conduit means with a high pressure zone;

(d) passing a particulate material having a density greater than that of the liquid from the high pressure zone, through the conduit means and into the vessel through its inlet;

(e) closing the inlet to the vessel;

(f) opening an outlet to the vessel; and (g) passing a mixture of liquid and particulate material through said outlet and from said vessel.

22. A process as in claim 21 wherein substantially all of the contents of the vessel are passed through the outlet and from the vessel.

23. A process as in claim 22 wherein liquid is displaced from the vessel as particulate material is introduced thereinto, and the displaced liquid flows upwardly into the conduit means.

24. A process as in claim 23 further comprising maintaining a liquid level in the conduit means by withdrawing from the conduit means an amount of liquid about equal to the amount of liquid displaced from the vessel.

25. A process as in claim 24 further comprising introducing liquid into the conduit means from the vessel and circulating said introduced liquid through the conduit means toward the inlet of the vessel as particulate material is passed through the inlet.

26. A process as in claim 25 wherein the particulate material comprises retorted oil shale at least a portion of which as a particle size within the range of ¼ inch to 4 inches, wherein the particulate material is metered in into the conduit means and through the inlet of the vessel, and wherein the high pressure zone has a pressure within the range from about 2 to about 2000 pounds per square inch guage.

27. A process comprising
(a) substantially filling a first vessel with a depressurized liquid then;
(b) pressurizing said liquid;
(c) displacing a portion of the pressurized liquid from said first vessel with a particulate material having a density greater than that of the pressurized liquid;
(d) conveying the displaced portion of the liquid to a second vessel;
(e) depressurizing the liquid in the second vessel; and then
(f) displacing a portion of the depressurized liquid from the second vessel with a particulate material having a density greater than of the liquid.

28. A process comprising:
(a) substantially filling a first vessel with a liquid; then
(b) pressurizing said liquid;
(c) displacing a portion of the liquid from said first vessel with a particulate material having a density greater than that of the liquid;
(d) conveying the displaced portion of the liquid to a second vessel;
(e) depressurizing the liquid in the second vessel; then
(f) displacing a portion of the depressurized liquid from the second vessel with a particulate material having a density greater than that of the liquid;
(g) withdrawing the particulate material from the second vessel; then
(h) transporting the particulate material through a high pressure zone; and then
(i) introducing the particulate material into the first vessel to displace the portion of the liquid therefrom.

29. A process as in claim 28 wherein the particulate material is transported upwardly through a first liquid level and downwardly through a second liquid level during transport between the second vessel and the first vessel.

30. A process as in claim 29 further comprising
(a) sealing said first vessel after said portion of the liquid is displaced therefrom; and
(b) exhausting the liquid and particulate material from the first vessel.

* * * * *